(12) United States Patent
Guetersloh et al.

(10) Patent No.: US 6,192,931 B1
(45) Date of Patent: Feb. 27, 2001

(54) DAMPER BLADE CONTROL

(75) Inventors: Timothy L. Guetersloh; Barry B Mulhall, both of Deerfield; Erick L. Sokn, Janesville, all of WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 09/111,826

(22) Filed: Jul. 8, 1998

(51) Int. Cl.[7] .................................................. F16K 11/14
(52) U.S. Cl. ...................... 137/601; 251/80; 251/129.13; 251/213
(58) Field of Search ............................ 137/601; 251/213, 251/228, 129.12, 129.13, 80, 81, 229

(56) References Cited

U.S. PATENT DOCUMENTS

| | | | |
|---|---|---|---|
| 2,831,648 | * 4/1958 | Meyer et al. | 251/81 |
| 3,011,754 | * 12/1961 | Ander | 251/81 |
| 4,262,652 | 4/1981 | Butzen | 251/81 X |
| 4,545,363 | 10/1985 | Barchechat et al. | 251/129.11 X |

* cited by examiner

*Primary Examiner*—Stephen M. Hepperle
(74) *Attorney, Agent, or Firm*—Andrus, Sceales, Starke & Sawall

(57) ABSTRACT

A device for controlling the movement of a damper mounted in a housing includes a shaft rotatably secured to the damper for pivoting the damper between an open position and a closed position. A lever arm is mounted on the shaft for rotation therewith and a spring is connected between the housing and the lever arm for normally urging the damper towards the open position. A motor is mounted on the housing and is actuable to overcome the force of the spring to move the damper to the closed position. A force translation arrangement is disposed between the motor and the lever arm for translating the driving force of the motor when the motor is energized to move the damper to the closed position, and for gradually braking the motor when the motor is de-energized and the spring returns the damper to the open position.

28 Claims, 10 Drawing Sheets

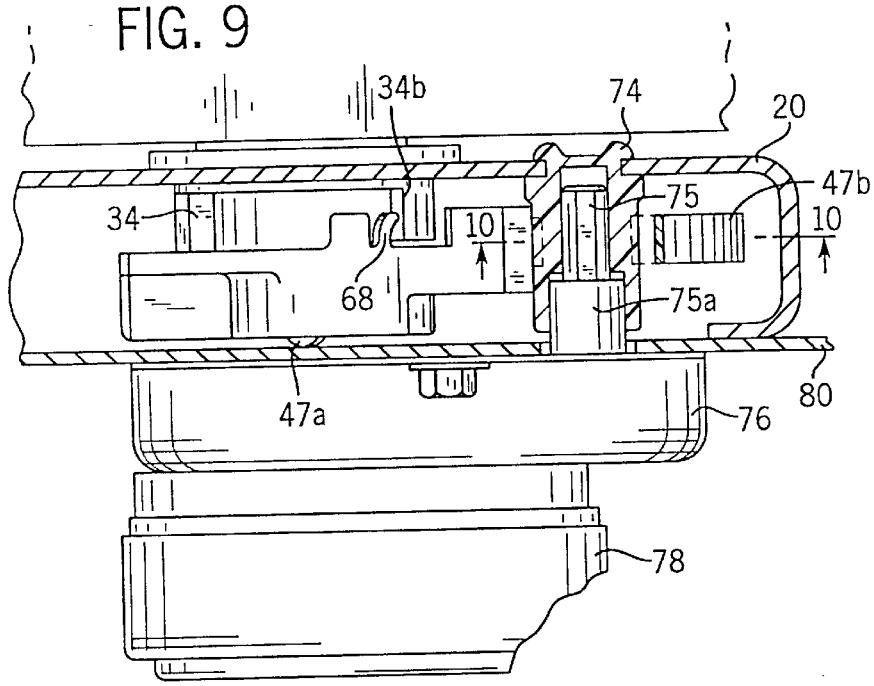
FIG. 9
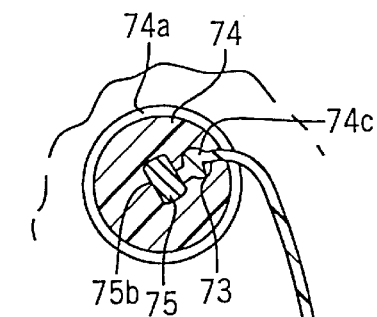
FIG. 10
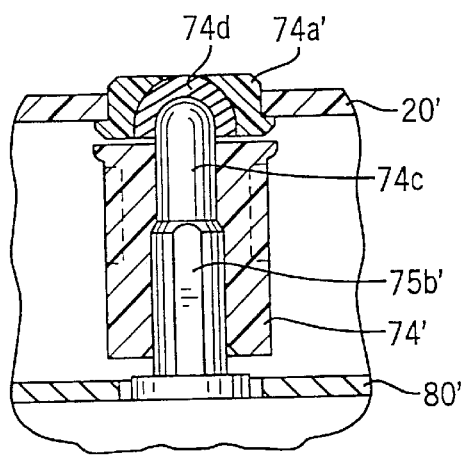
FIG. 16
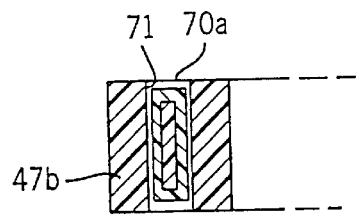
FIG. 11
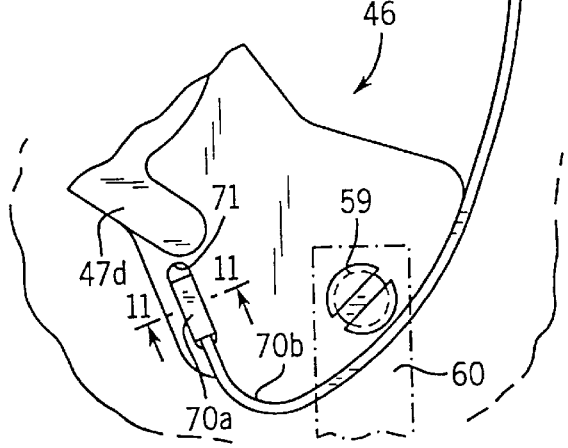

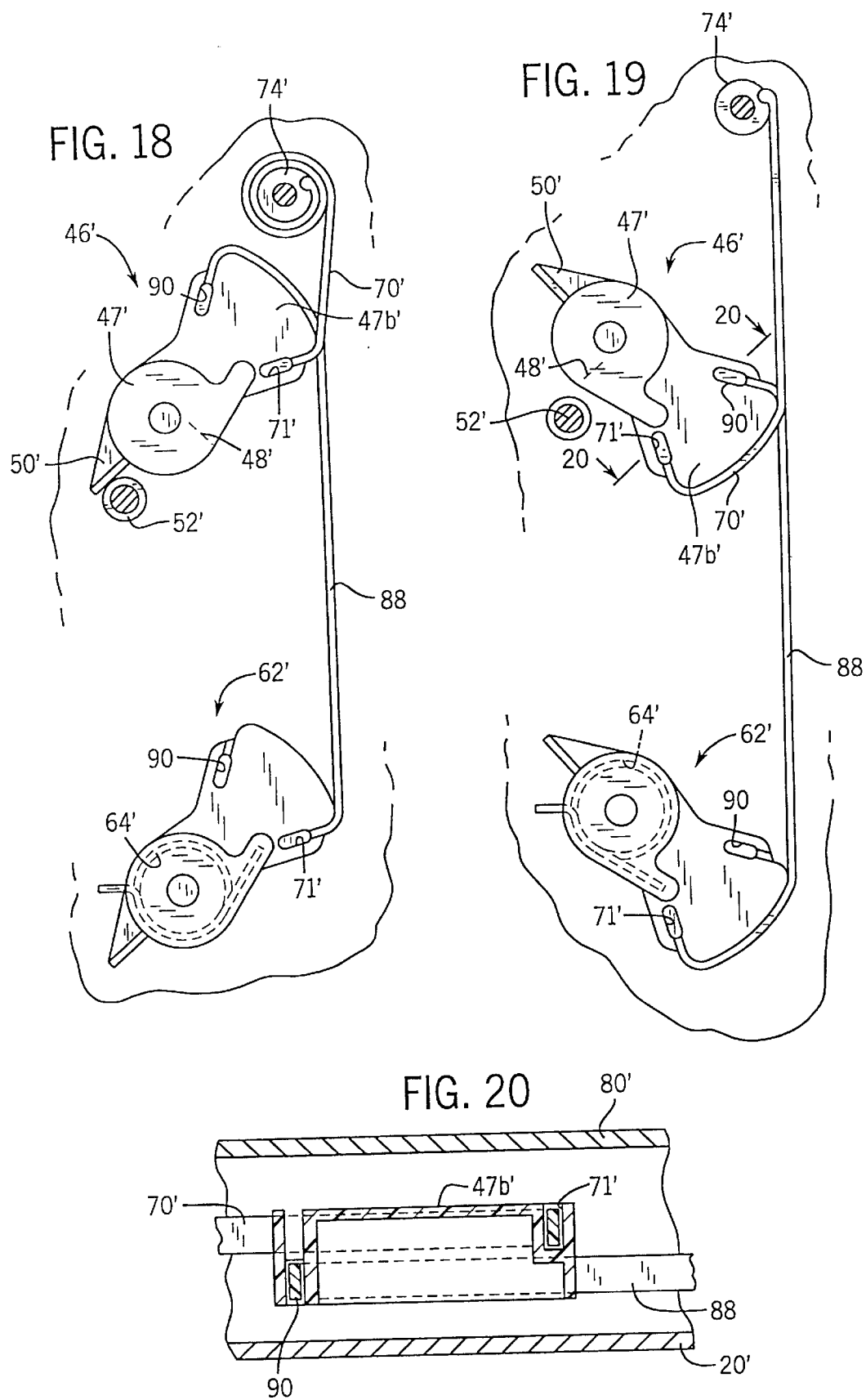

DAMPER BLADE CONTROL

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to a heating and cooling system including a damper blade assembly rotatably mounted within a duct to deliver conditioned air to an enclosure, and in particular, to an arrangement for controlling the position of the damper blade assembly within the duct in accordance with the sensed temperature of the air in the enclosure.

BACKGROUND OF THE INVENTION

Many multi-room structures, such as office buildings and schools as well as residential buildings constructed during the past several years, include heating and cooling systems to deliver either relatively warm or cool conditioned air from a central source thereof to each of the enclosures or rooms in the building. Typically, one or more ducts are employed to deliver the air to each enclosure. Very often, an automatically operated damper blade assembly or similar mechanism is installed in the duct to regulate the flow of air to one or more discharge outlets located in the enclosure being conditioned by the discharge of air thereinto. The movement of the damper blade assembly may be responsive to changes in the temperature of the enclosure.

Many of these automatically operated damper blade assemblies use a spring to open the damper and an opposing electric motor and gear train assembly to close the damper and hold it in the closed position when conditioned air is not needed in the enclosure. The damper, the spring, the motor and its gear train assembly are interconnected such that as the motor closes the damper it also acts against the spring. When the motor is de-energized, the spring reacts to open the damper and in doing so rotates the motor shaft in the direction opposite its drive direction until the damper reaches an end stop defining its open position.

Certain problems, however, arise when the exact requirements of the damper blade assembly are examined. On the one hand, a relatively strong opening force for the spring is required to ensure that any friction or binding forces on the moving parts of the damper blade assembly will be overcome. On the other hand, the gear train associated with the motor is relatively fragile and will not withstand much in the way of an impact such as can be caused when a moving gear train is stopped suddenly. As a strong spring force drives the damper to an open position, it is subjecting the gear train to a substantial amount of torque. In currently used damper blade assemblies, when the damper reaches the end of its travel towards the open position and contacts an end stop, this torque is transferred to the gear train as an impact force with the result that the gear train may be damaged. Similarly, the gear train can easily be damaged if the damper blade assembly is turned by hand with too much force. This sometimes occurs during the packaging and installation of the system. While some vendors include a shock absorbing spring and add play to the assembly to reduce the chance of over-stress damage, wear of the gears continues to limit the life of the damper blade assembly. The cost of the damper blade assembly is high due to the number of parts and tolerances required.

Accordingly, it remains a challenge to construct a mechanism that can maintain the narrow balance between too powerful a spring which will damage the gear train and too weak a spring which will not be able to overcome the friction and drag that will generally increase as the damper becomes worn during its service life. In addition, it remains desirable to prevent over-stress damage to the damper blade assembly by permitting the gear train and the motor to slowly decelerate instead of causing the impact that occurs in the conventional mechanisms when they suddenly stop and the damper hits its end stop in the open position.

BRIEF SUMMARY OF THE INVENTION

The present invention advantageously provides a damper blade control employing a management arrangement which is reliant on a strong spring force for opening yet prevents the torque applied from being transferred to the gear train in a damaging manner. With such construction, an automatically operated damper blade control is provided which ensures positive opening and closing of the damper without exceedingly high manufacturing, installation and servicing costs.

It is an object of the present invention to effectively regulate the flow of conditioned air through a supply duct to a discharge outlet located in an enclosure.

It is a further object of the invention to effectively control the position of a damper blade mounted within a duct to control the conditioned air flow through the duct.

It is yet another object of the invention to produce a low cost, simplified yet reliable damper blade assembly using non-precision parts.

Still yet another object of the invention is to provide a damper blade assembly having a unique force translation arrangement which will operate equally well between the opening and closing positions of the damper.

In one aspect of the invention, a device for controlling the movement of a damper mounted in a housing between an open position and a closed position comprises a shaft rotatably secured to the damper for pivoting the damper between the open position and the closed position. A lever arm is mounted on the shaft for rotation therewith, and a spring is connected between the housing and the lever arm for normally urging the damper towards the open position. A motor is mounted on the housing and is actuable to overcome the force of the spring to move the damper to the closed position. A force translation arrangement is disposed between the motor and the lever arm for translating the driving force of the motor when the motor is energized to move the damper to the closed position, and allow gradually braking the motor due to its internal friction when the motor is de-energized and the spring returns the damper to the open position.

In yet another aspect of the invention, there is contemplated a drive system for a damper rotatably mounted on a shaft in a housing between an open position and a closed position. The housing includes a rotatable element joined to the shaft for rotation therewith, a biasing element is provided for urging the damper to the open position, and a motor is actuable to overcome the force of the biasing element to move the damper to the closed position. The improvement resides in a wind-up spool mounted on the housing in driving engagement with the motor. A flexible band extends between the spool and the rotatable element, the band being windable upon the spool when the motor is selectively actuated to move the damper to the closed position. The band is unwindable from the spool when the motor is deactivated allowing the biasing element to rotate the shaft, the damper, the rotatable element, the motor and the spool such that the damper returns to the open position. The spool and the band define an over-travel mechanism for preventing damage to the motor as the damper assumes the open position.

Still another aspect of the invention contemplates a mechanism for driving at least one damper supported on a housing for motion between an open position and a closed position. The mechanism comprises at least one rotatable shaft secured to at least one damper for pivoting the damper between the open position and the closed position. A lever arm is mounted on the at least one shaft for rotation therewith, the lever arm being equipped with a pair of stop surfaces. A pair of stops are secured to the housing, each of the stops being engageable with one of the stop surfaces so as to define the limits of travel of the damper corresponding to the open position and the closed position. A biasing device is connected between the housing and the lever arm for normally urging the at least one damper towards the open position. A spool is rotatably mounted on the housing, and a flexible band extends between the spool and the lever arm, the band being windable upon the spool. A motor is drivingly connected to the spool wherein selective actuation of the motor enables the band to be wound upon the spool so as to overcome the force of the biasing device, and rotate the at least one shaft, the at least one damper, and the lever arm towards the closed position at which one of the stop surfaces engages one of the stops. Selective deactivation of the motor enables the biasing device to rotate the at least one shaft, at least one damper, the lever arm, the motor and the spool until the open position is reached at which the other of said stop surfaces engages the other of the stops and rotation of the at least one shaft, the at least one damper and the lever arm is terminated. The motor and the spool continue to rotate by their own inertia causing the band to unwind from the spool and enable the gradual slowdown of the motor to prevent damage thereto.

Various other objects, features and advantages of the invention will be made apparent from the following description taken together with the drawings.

BRIEF DESCRIPTION OF THE SEVERAL VIEWS OF THE DRAWING

The drawings illustrate the best mode presently contemplated of carrying out the invention. Like numerals denote like elements.

In the drawing:

FIG. 9 is a sectional view on line 9—9 of FIG. 4 showing the interconnection between a motor shaft and a spool of the present invention;

FIG. 10 is a partial sectional view taken on line 10—10 of FIG. 9;

FIG. 11 is a sectional view taken on line 11—11 of FIG. 10;

FIGS. 12(*a*) and 12(*b*) are diagrammatic views of an integral trigger spring;

FIG. 16 is an alternative embodiment of the motor shaft and spool of FIG. 9;

FIG. 18 is an alternate embodiment of a damper control in the closed position;

FIG. 19 is an alternative embodiment of the damper control of FIG. 18 in the open position; and FIG. 20 is a sectional view taken on line 20—20 of FIG. 19.

DETAILED DESCRIPTION OF THE INVENTION

The present invention is particularly well suited for heating and cooling systems utilizing zoned control, the air flow to each zone being controlled by a motorized damper blade assembly 10 embodying the present invention. By strategically locating the motorized damper blade assembly 10 in the heating and cooling systems, each zone can be controlled by its own thermostat set to a different temperature.

Figure 1:
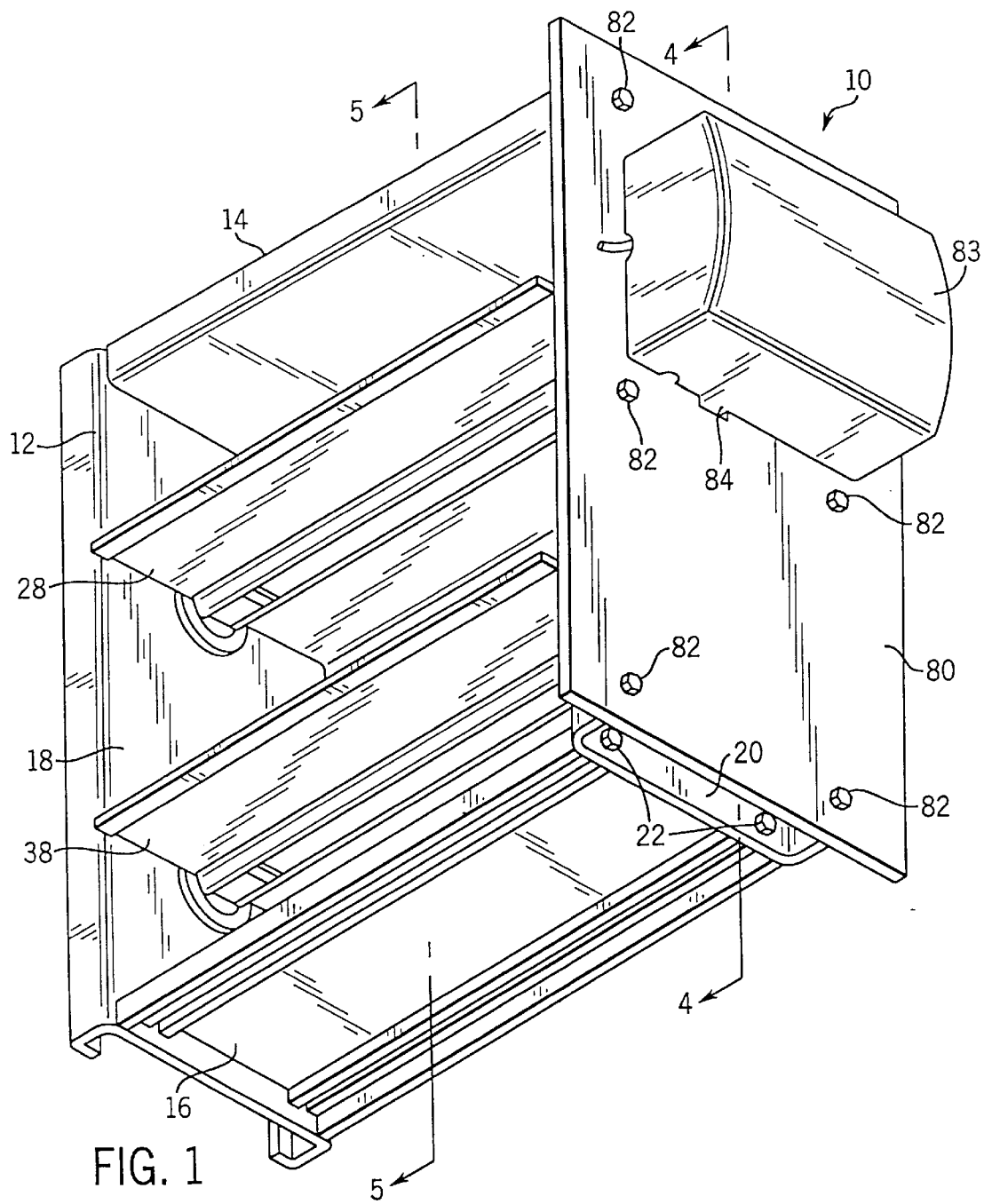
FIG. 1 is a perspective view of a damper housing having a damper control embodying the present invention so as to control the movement of a pair of damper blades.
Figure 2:
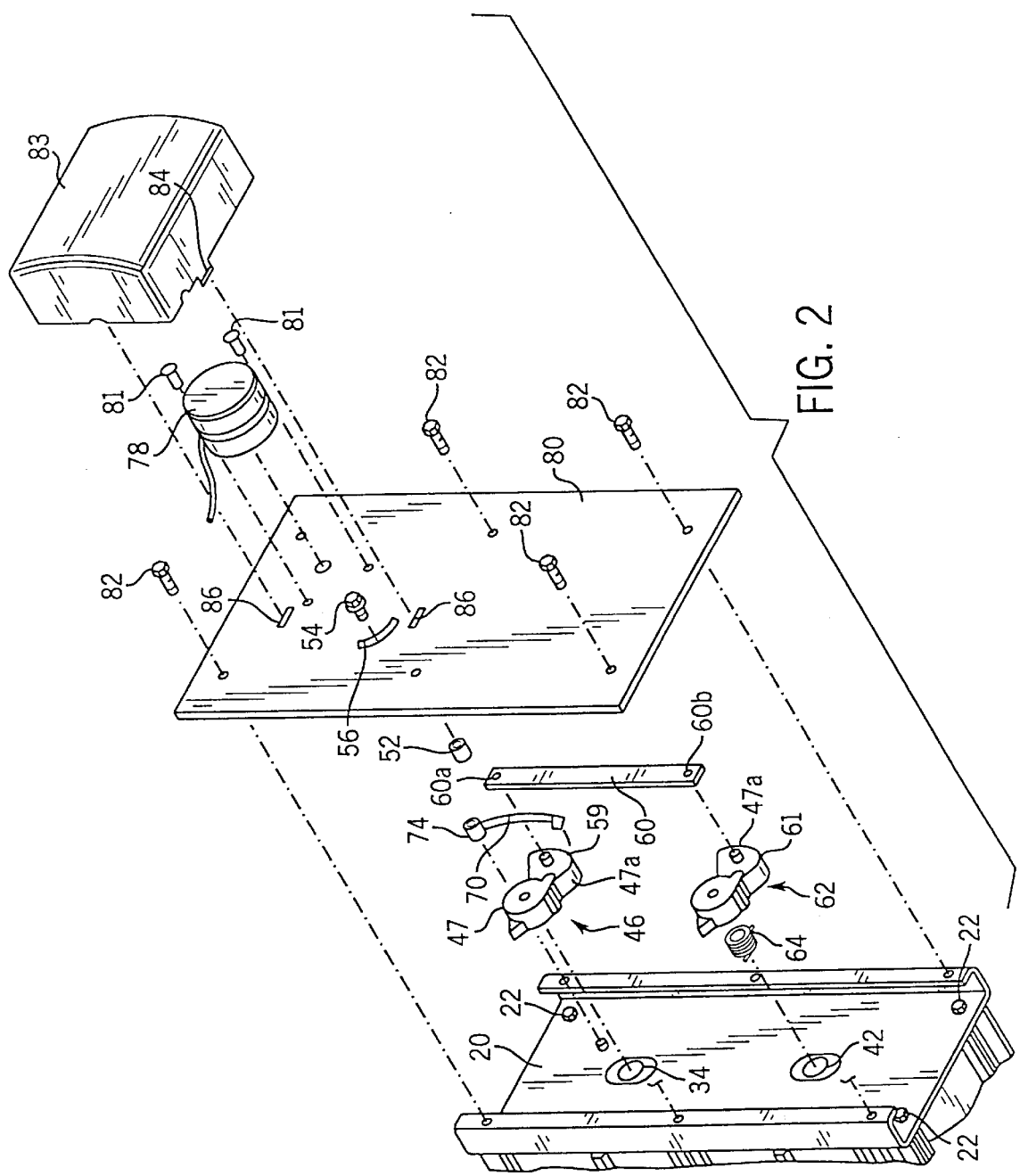
FIG. 2 is an exploded view of a portion of the damper control shown in FIG. 1.
Figure 3:
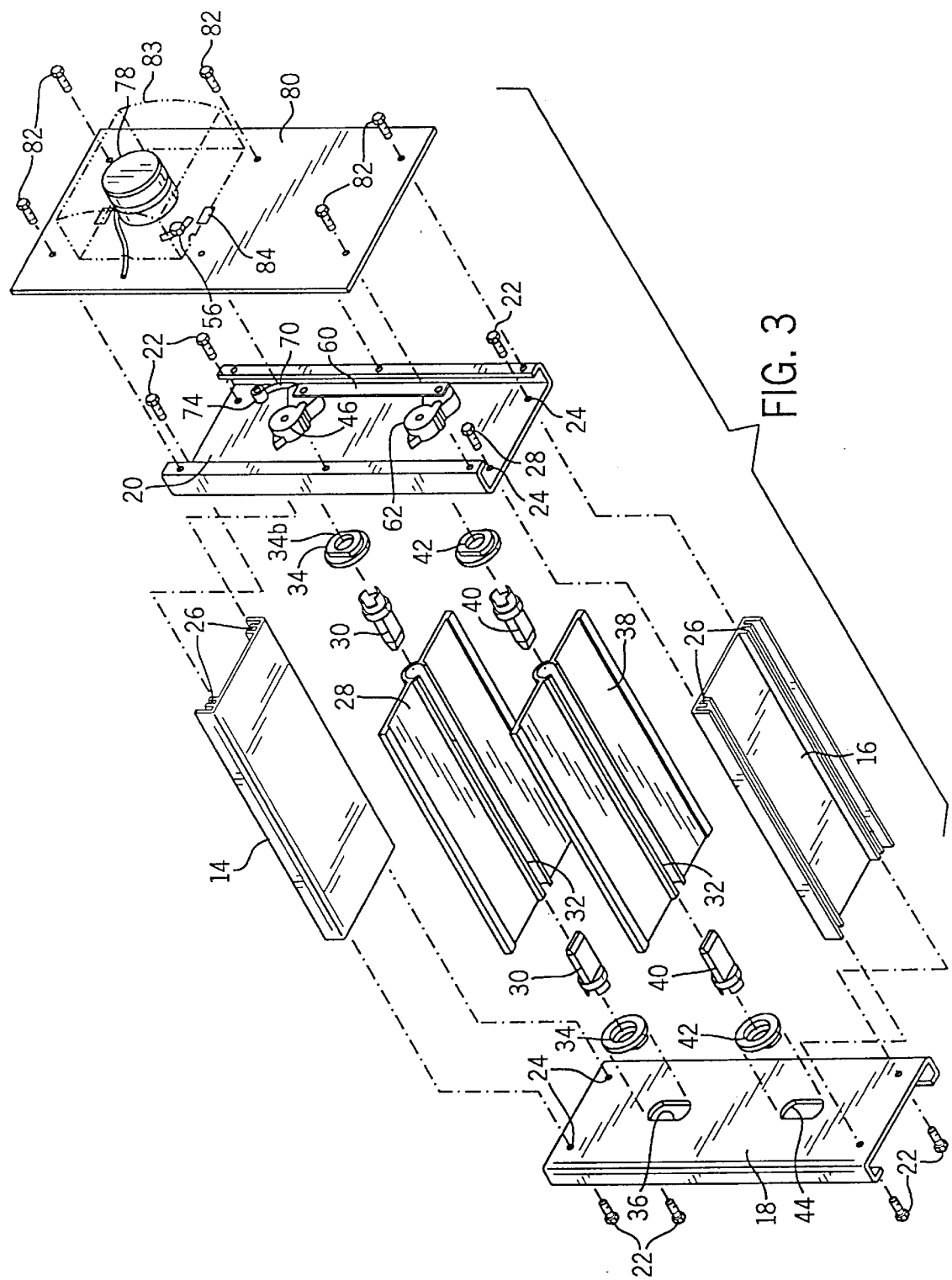
FIG. 3 is an exploded view of the entire damper control shown in FIG. 1.
Figure 6:
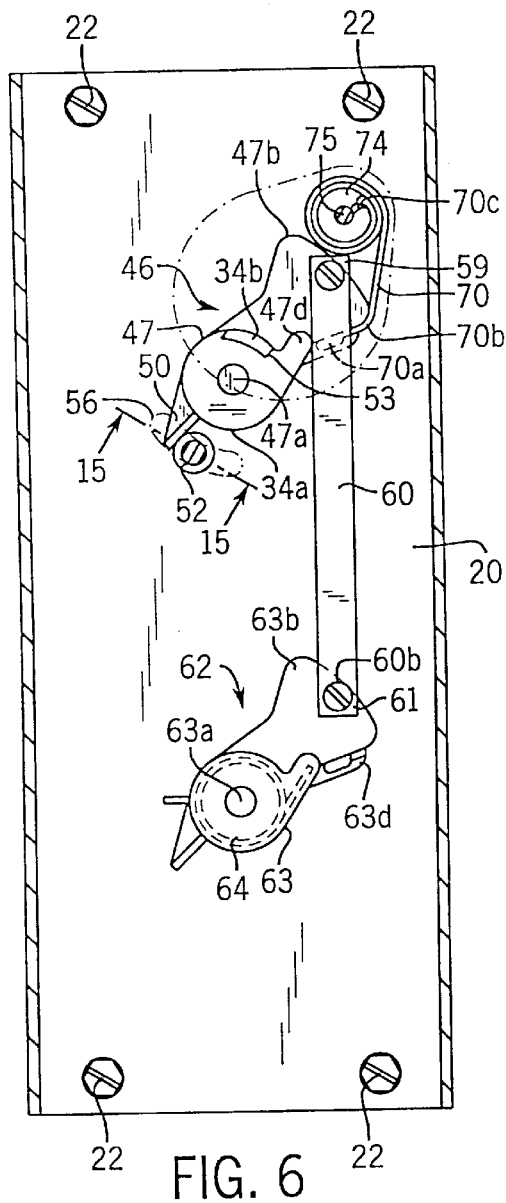
FIGS. 6 and 7 are views similar to FIGS. 4 and 5 but showing the damper control in the closed position.
Figure 4:
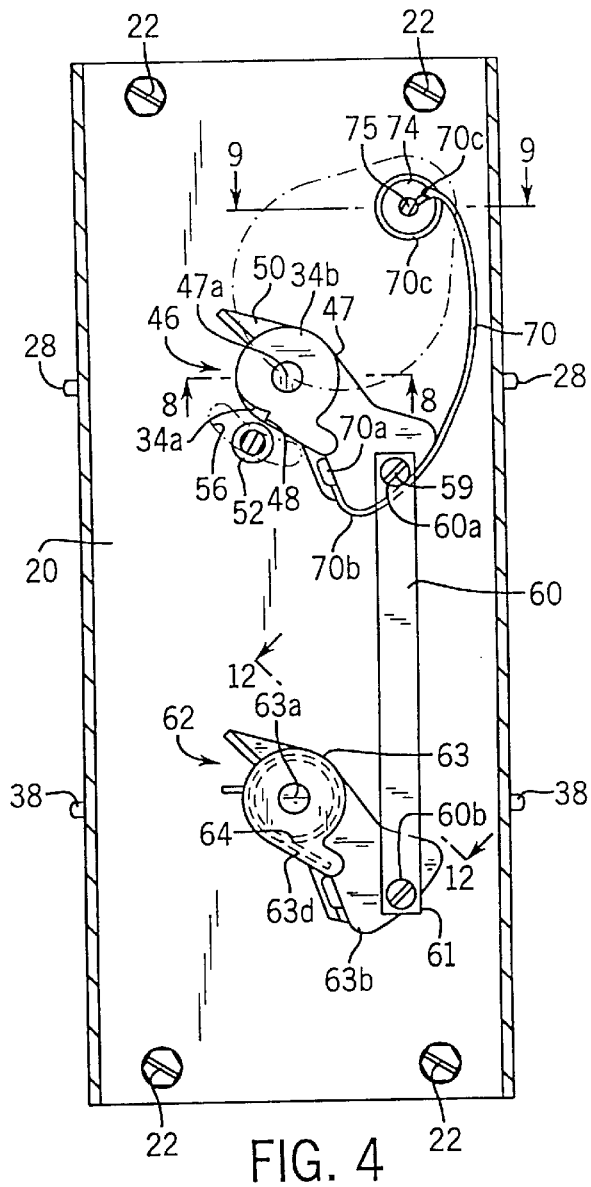
FIG. 4 is a sectional view of the damper control shown in the open position as taken on line 4—4 of FIG. 1.
Figure 13A:
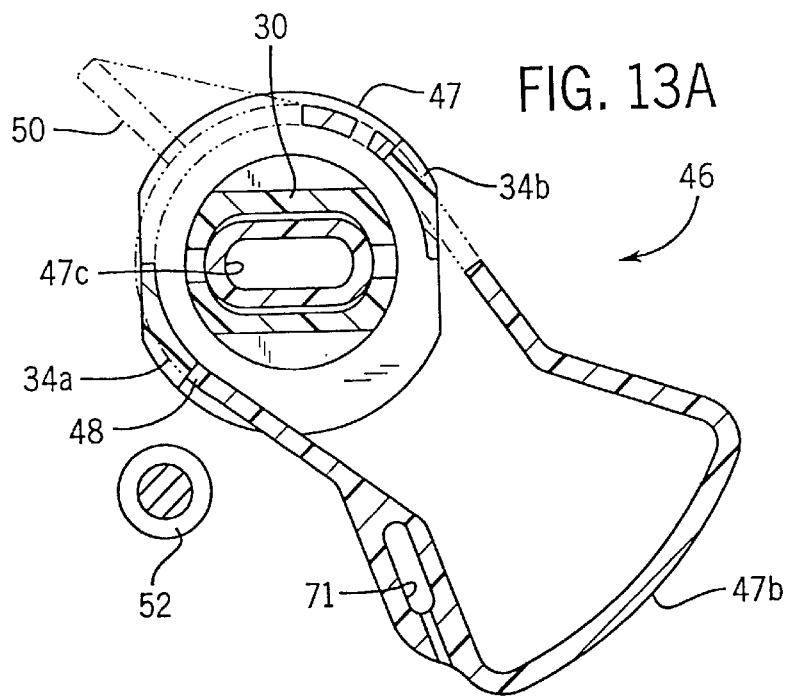
FIGS. 13A and 13B are fragmentary sectional views of the upper lever arm of FIG. 4 in the open and closed positions, respectively.
Figure 13B:
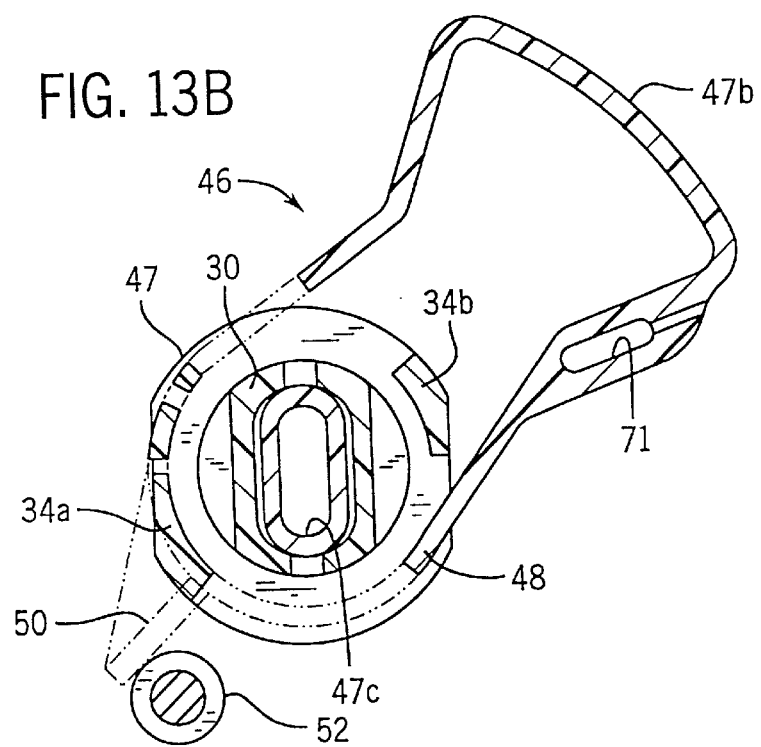

Referring to FIGS. 1, 2 and 3, a rotatable damper blade assembly 10 is positioned within a housing 12 interposed within the duct work of a heating and cooling system (not shown). Housing 12 includes a top wall 14, a bottom wall 16 and a pair of parallel, spaced apart, flanged sidewalls 18, 20. A set of fasteners 22 passes through suitable apertures 24 on sidewalls 18, 20, and is screwed into threaded guideways 26 formed on top wall 14 and bottom wall 16 to hold housing 12 together. A first or upper rotatable damper blade 28 is provided at each end thereof with a stub shaft 30 having an inner end which is fixedly secured in a hollow channel 32 running longitudinally of damper blade 28. An outer end of stub shaft 30 is disposed for rotation in a circular bearing retainer 34 friction fitted into opening 36 on each sidewall 18, 20. Alternately, bearing retainer 34 can be snap fit into opening 36. The bearing retainer 34 is integrally formed with a first raised rim or stop 34*a* (FIGS. 13A—13B) defining a damper blade open position and a second raised rim or stop 34*b* spaced from the first stop 34*a* defining a damper blade closed position. A second or lower damper blade 38 is disposed beneath first rotatable damper blade 28, and also includes stub shafts 40 and circular bearing retainers 42 with stops 42*a*, 42*b* (FIGS. 14*a*, 14*b*) constructed and mounted in openings 44 identically as described above with respect to bearing retainer 34. As is well understood, first and second damper blades 28, 38 are designed to rotate between an open or horizontally disposed position (FIGS. 4 and 5) so as to permit air flow through a particular sector of duct work, and a closed or vertically oriented position (FIGS. 6 and 7) so as to block air flow in a particular sector of the duct work.

Figure 15:
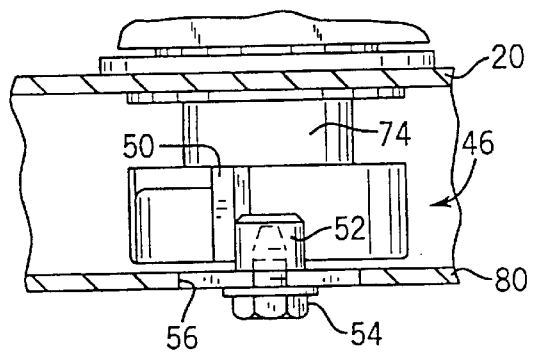
FIG. 15 is a sectional view on line 15—15 of FIG. 6.
Figure 7:
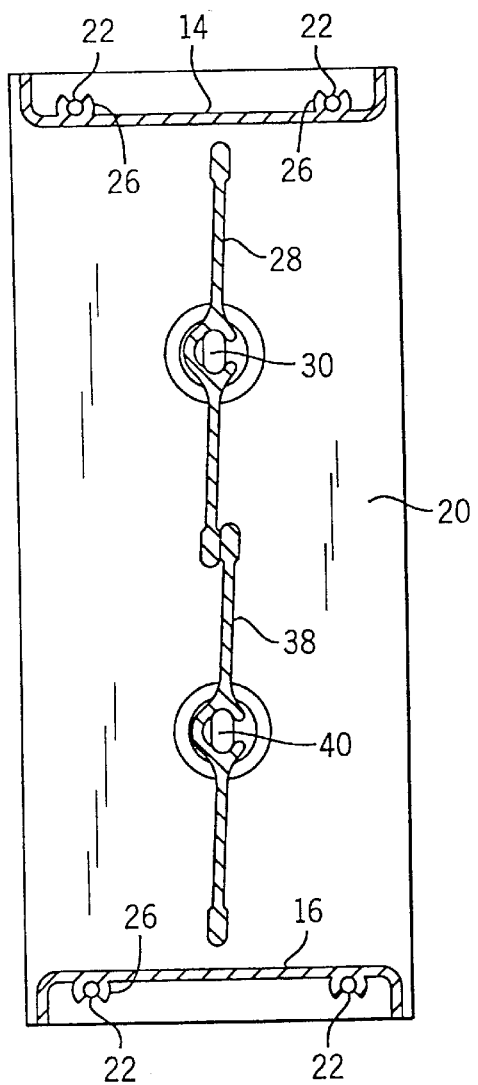
Figure 5:
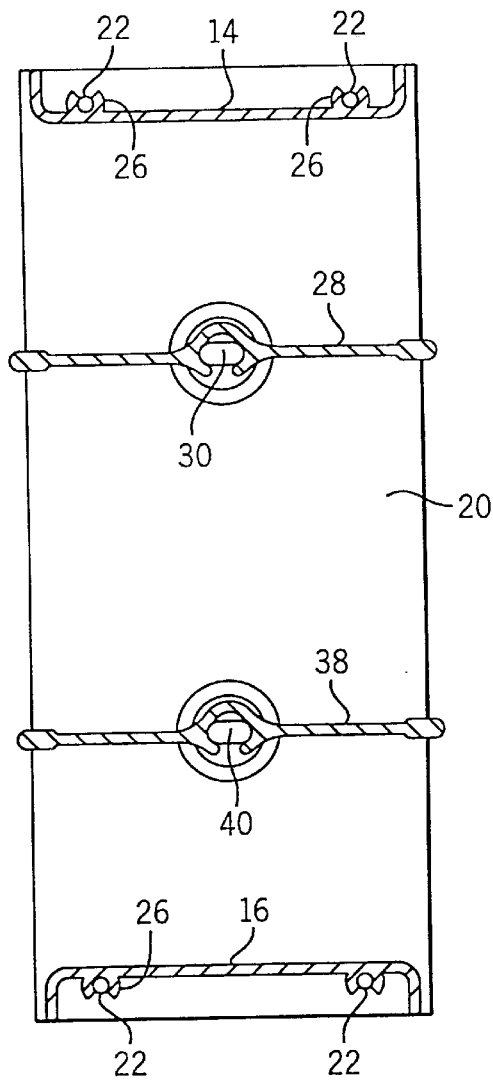
FIG. 5 is a sectional view of the damper control shown in the open position as taken on line 5—5 of FIG. 1.
Figure 8:
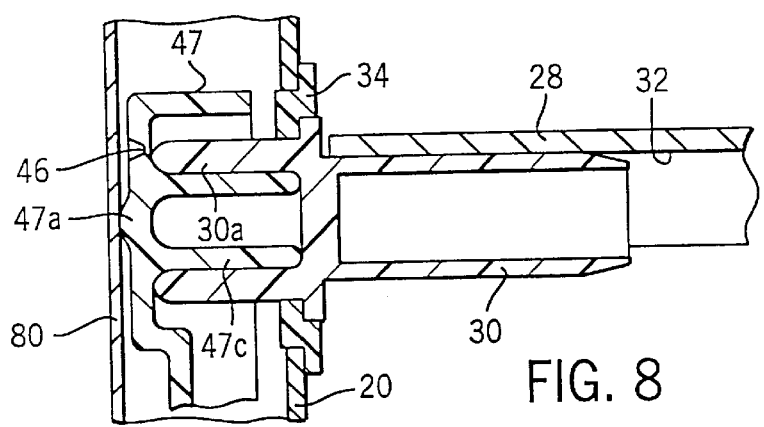
FIG. 8 is a sectional view on line 8—8 of FIG. 4.
Figure 12:
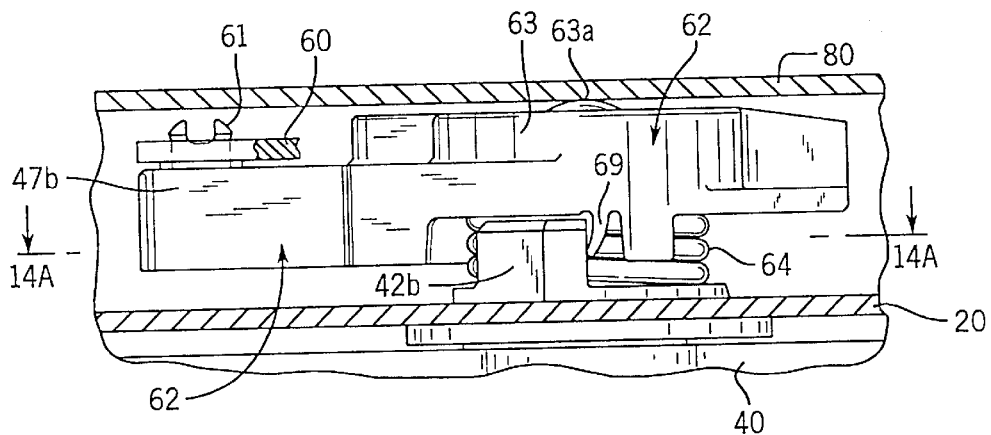
FIG. 12 is a sectional view taken on line 12—12 of FIG. 4.
Figure 12A:
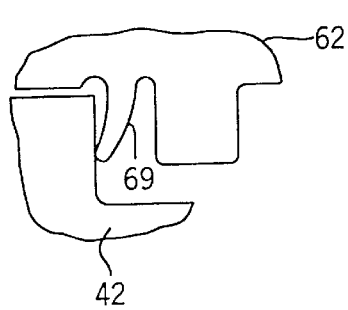
Figure 12B:
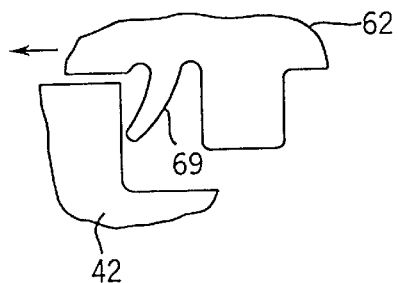

As seen in FIGS. 3–8, a first or upper lever arm 46 having a circular hub 47 with a spherical protrusion 47a and a fish-tail shaped portion 47b integral therewith is friction fitted via a depending skirt 47c (FIG. 8) on the outer end 30a of stub shaft 30 for rotation therewith. The hub 47 includes an eccentric finger 47d for a purpose to be appreciated hereafter. Lever arm 46 is provided with a pair of spaced apart stop surfaces 48, 50. Stop surface 48 (FIGS. 13A, 13B) is notched into the bottom of hub 47 and is engageable with the first stop 34a on bearing retainer 34 lying beneath lever arm 46, and corresponding to the fully open position of damper blades 28, 38 (FIG. 5). The other stop surface 50 extends outwardly from the periphery of hub 47 and is engageable with an adjustable stop post 52 (FIG. 6) extending inwardly from a face plate or motor plate 80 corresponding to the fully closed position of damper blades 28, 38 (FIG. 7). Stop post 52 is adjustable by removing screw 54 (FIG. 15) threaded into stop post 52, and moving the stop post 52 along a slot 56 (FIGS. 4, 6) formed in motor plate 80 so as to change the closed position as desired. Lever arm 62 has a similar notch 62a engageable with stops 42a to define the open position (FIG. 14A) An elongated tension member in the form of a link 60 has an upper end formed with a first clearance hole 60a, the circular wall of which is snap fitted over a first pivot post 59 (FIG. 4) on lever arm 46. A lower end of link 60 has a second clearance hole 60b, the circular wall of which is snap fitted over a second pivot post 61 (FIG. 6) of a second or lower lever arm 62 mounted on rotatable stub shaft 40 of lower damper blade 38 by a friction fit. Lever arm 62 is constructed identical to lever arm 46 and enables a modular design in which lever arms may be freely substituted and added according to the damper blades desired, there being one lever arm for each damper blade. Elements 63a, 63b and 63d correspond to elements 47a, 47b and 47d, respectively. Link 60 and lower lever arm 62 function to transmit motion from upper damper components to lower damper components so that upper damper blade 28 and lower damper blade 38 will move in unison. In the preferred embodiment, the link 60 is typically a rigid element fabricated from metal or plastic but the invention also contemplates a non-rigid link as will be appreciated hereafter.

Figure 14A:
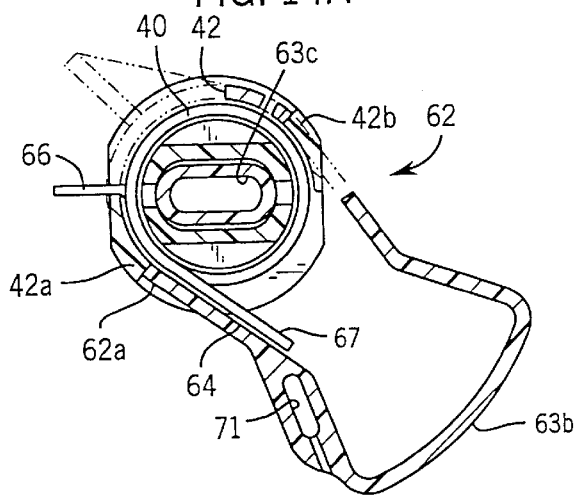
FIGS. 14A and 14B are sectional views similar to FIGS. 13A and 13B taken on line 14A of FIG. 12 showing the lower lever arm in open and closed positions, respectively.
Figure 14B:
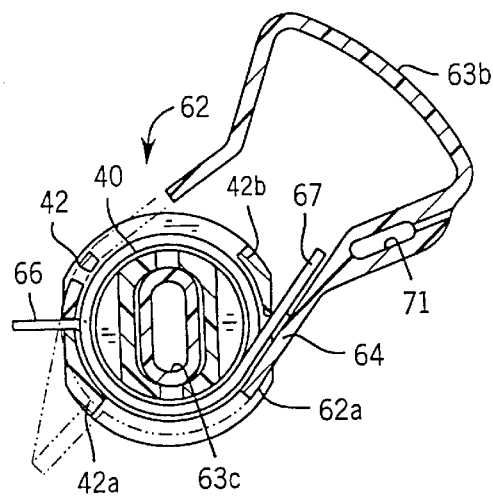
Figure 17:
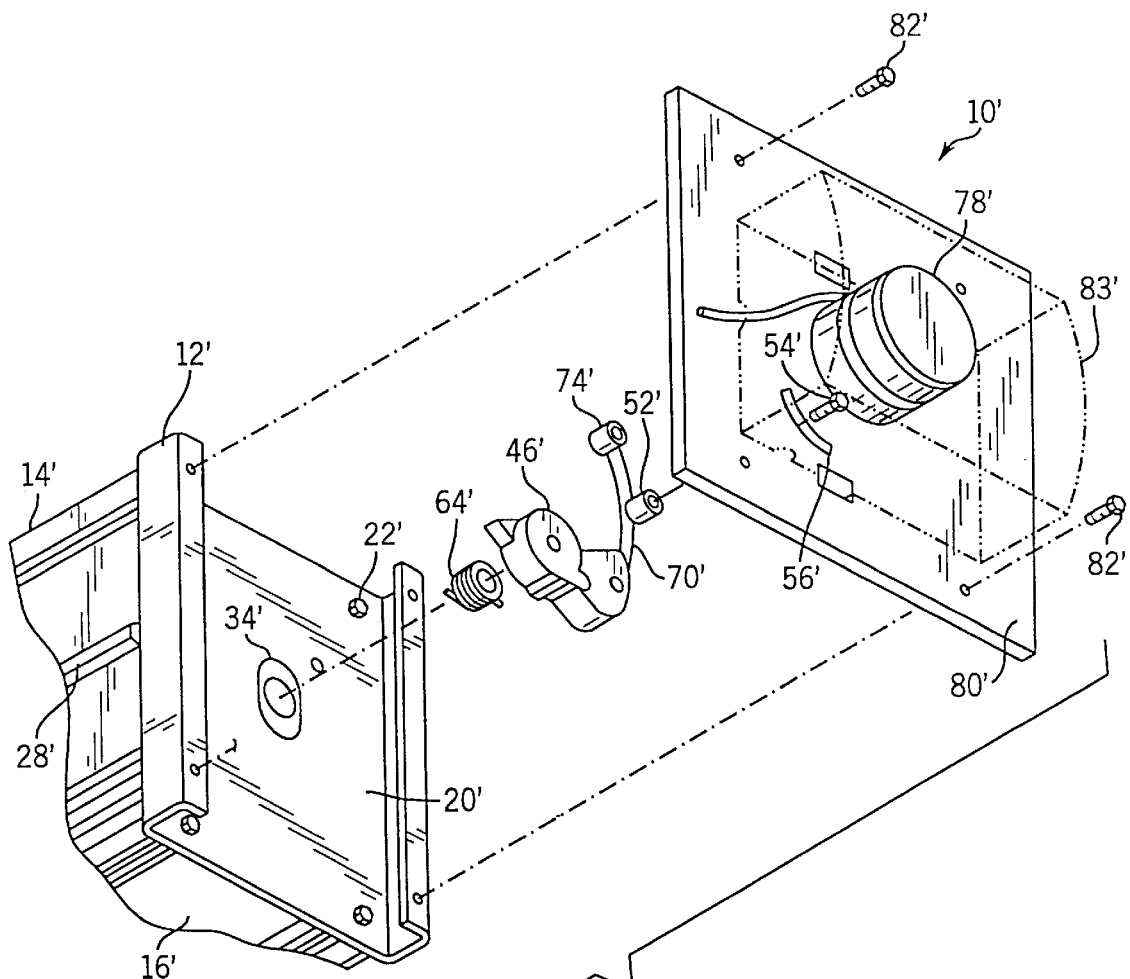
FIG. 17 is a partial exploded view of a damper control embodying the present invention so as to control the movement of a single damper blade.

A torsion spring 64 surrounds stub shaft 40 between sidewall 20 and lever arm 62, and is nested beneath and within the finger 63d of lever arm 62. One end 66 of spring 64 is held against stop 42a and a second end 67 bears against portion 63b beneath the finger 63d. (FIGS. 14A and 14B) Spring 64 is normally disposed in a condition which acts to rotate shafts 30, 40, lever arms 46, 62 and damper blades 28, 38 in a clockwise rotation to the fully opened position with stop surface 48 contacting stop 34a. Lever arm 62 has similar notch 62a engageable with stops 42a to define the open position (FIG. 14A). In the twin damper blade design, torsion spring 64 is shown positioned around the lower stub shaft 40. In the non-rigid link embodiment, the spring force acting on the lower lever arm 62 maintains a tensile load on the non-rigid link under all operating conditions. However, it should be understood that the torsion spring 64 may be installed around the upper stub shaft 30 for a single damper blade (as shown in FIG. 17) or around the lower stub shaft 40.

An additional feature of the invention shown in FIGS. 9, 12, 12a and 12b resides in a pair of trigger springs 68, 69 integrally formed on the bottom of the lever arms 46, 62. The purpose of the trigger spring 68, 69 is to eliminate free play between the damper blades 28, 38 caused by the clearance holes 60a, 60b in the link 60 and other dimensional variations on the elements of the control. The force applied by the trigger springs 68, 69 works opposite to the torsion spring 64 located on one of the lever arms 46, 62. The engagement of the closed stop of 42b by the lever arm 62 limits the travel of the torsion spring 64. By adding the trigger springs 68, 69, each lever arm 46, 62 will rotate until it contacts one side of the clearance hole 60a, 60b in the link 60. The torque produced by the torsion spring 64 is sufficient to overcome the combined torque of the integral springs 68, 69. This allows the damper blades 28, 38 to be held in open position while eliminating the free play.

A flexible, reinforced belt or band 70 has a lug 70a (FIG. 10) at one end dropped into a retention slot 71 formed in one side of the fish-tailed portion 47b of lever arm 46, and a medial portion 70b extends about a peripheral surface 72 thereof. Another end 70c of band 70 is snapped into a retention slot 73 formed in take-up spool 74 rotatably disposed in an optional spool bearing 74a mounted in sidewall 20. Spool 74 is drivingly engageable with a shaft 75 (FIG. 9) having a flat 75b (FIG. 10) extending from a bearing 75a of a gear train 76 and an electric motor 78, both of which are mounted by fasteners 81 on the outside of motor plate 80 which in turn is secured to sidewall 20 by fasteners 82. A loose fit between the shaft 75 and the spool 74 compensates for misalignment of the parts during assembly. Motor 78 is preferably a 24 volt A/C synchronous hysteresis motor which can be stalled indefinitely without overheating so as to maintain damper blades 28, 38 in their closed position as long as desired. As seen in FIGS. 1 and 2, gear train 76 and motor 78 are protected by an enclosure 83 which is removably secured to motor plate 80 by suitable clips 84 engageable in horizontal slots 86 formed in motor plate 80. As will be appreciated hereafter, motor 78, when selectively actuated, acts to rotate lever arms 46, 62 shafts 30, 40 and damper blades 28, 38 to the closed position against the force of spring 64.

Alternatively as shown in FIG. 16, the shaft 75 has a polygonal periphery 75b' for driving the spool 74' and a ball-type head 74c freely rotatable in a socket 74d fixed in the spool bearing 74a'. This version allows for a larger misalignment between cover plate 80' and sidewall 20' to be compensated for.

With the heating and cooling system in operation, motor 78 responds to a control arrangement which sends a signal corresponding to the thermostat in a specific zone of the system. Damper blade assembly 10 is designed so that movement of damper blades 28, 38 by the spring force to their open position (FIGS. 4 and 5), creates slack in band 70 thereby preventing damaging force from being transferred to the motor 78 and its relatively fragile gear train 76. When motor 78 is energized as dictated by the control arrangement, motor 78 and gear train 76 will rotate spool 74 such that band 70 will be wound thereon, and will transfer a pulling force which overcomes spring 64 to rotate lever arms 46, 62, shafts 30, 40 and damper blades 28, 38 to their closed position (FIGS. 6 and 7) at which stop surface 50 engages stop post 52. It should also be seen that the spring 64 is engaged with the underside of hub 47 of lever arm 62 as the damper blades 28, 38 move to a closed position. As long as motor 78 continues to be energized, damper blades 28, 38 remain closed.

When motor 78 is de-energized, the force of spring 64 will rotate the lever arms 46, 62 shafts 30, 40 and damper blades 28, 38, spool 74, motor 78 and gear train 76, which move together until stop surface 48 re-engages stop 34a. In a damper design without over-stress protection as provided by the present invention, gear train 76 and motor 78 would be subjected to a sudden stop, inflicting almost certain damage to these drive elements. Because of spool 74 and flexible band 70 which begins to unwind upon engagement between stop surface 48 and stop 34a, motor 78 and gear train 76 continue to rotate by their own inertia and enable a gradual braking or slow-down of motor 78 and gear train 76 due to internal friction to prevent damage thereto. Spool 74 and flexible band 70 thus act as a force translation arrangement in ensuring the positive opening and closing of damper blades 28, 38 without harm to the driving mechanism.

It should be appreciated that the present invention provides an improved damper drive mechanism which spares damage to driving motor 78 and gear train 76 through the use of a wind-up spool and band over-travel arrangement 74, 70 which allows motor 78 and gear train 76 to slowly decelerate. By employing this arrangement, damper blade assembly 10 is simplified by reducing the number of components, and enabling the assembly to use non-precision parts, both of which contribute to a lower production cost.

It should be further appreciated that the snap feature which connects the link 60 to the lever arms 46, 62 spaces the link 60 at a distance from the motor plate 80 so that no rubbing or dragging will occur. The lever arms 46, 62 are specifically manufactured to be assembled in proper orientation only when the torsion spring 64 is correctly installed. Spool bearing 74a supports spool 74 reducing side loading of motor 78 and helps improve the life of motor bearing 75a. In addition, the integral trigger springs 68, 69 eliminate wobble or rattle of the damper blades 28, 38. Owing to their modular design, the lever arms 46, 62 are both provided with retention slots 71 on the same side thereof so they can interchangeably connect to band 70. In addition, each of the lever arms 46, 62 is formed with the spherical protrusion 47a which provides a single low friction point engageable against motor plate 80.

FIG. 17 illustrates a rotatable damper assembly 10' for a single damper blade 28' as described above. In this version, there is no need for counterparts of the lower lever arm 62 and the link 60. However, the torsion spring 64' is nested in the lever arm 46' and surrounds the stub shaft 30'. The band 70' and spool 74' are identical to those elements previously described.

FIGS. 18–20 show an alternative embodiment of the invention, wherein the elongated rigid link 60 is replaced by a non-rigid, flexible belt 88. In this version, the fish-tail shaped portion 47b' of upper lever arm 46 as well as lower lever arm 62' are each formed with a pair of belt retention slots 71', 90. As best seen in FIG. 20, each pair of slots 71' is vertically offset from the pair of slots 90 to prevent the band 70' from interfering with belt 88. As previously described, band 70' runs between spool 74' and retention slot 71' on upper lever arm 46'. Belt 88 runs between slot 90 on upper lever arm 46' and slot 71' on lower lever arm 62'. As the motor 78 wraps the band 70' around the spool 74', the upper lever arm 46' rotates. Since the turning arc is identical for both lever arms 46', 62', the length of belt 88 therebetween remains constant. This keeps the angular velocity and position of both lever arms constant. By placing the torsion spring 64' on the lever arm 62' farthest from the motor 78, and disposing the open stop 48' on the lever arm 46' closest to the motor 78, the connecting member is always in tension. This allows a flexible material like the belt 88 to be used in lieu of the rigid link 60 and eliminates all free play (i.e. rattle) from the assembly.

An additional advantage of this concept is the maximization of the mechanical advantage. This is accomplished by an increase in the moment arm as measured from the center of rotation to the location of applied force. The radiused lever arm keeps this distance at a maximum throughout the full range of motion.

While the invention has been described with reference to a preferred embodiment, those skilled in the art will appreciate that certain substitutions, alterations and omissions may be made without departing from the spirit thereof. For example, although the preferred embodiment of the invention described herein shows flat damper construction, it should be understood that the invention can also be utilized with dampers having circular cross section and particularly those having a large diameter. Accordingly, the foregoing description is meant to be exemplary only, and should not be deemed limitative on the scope of the invention set forth with following claims.

We claim:

1. A device for controlling the movement of a damper mounted in a housing between an open position and a closed position, the device comprising:

a shaft rotatably secured to said damper for pivoting said damper between said open position and said closed position;

a lever arm mounted on said shaft for rotation therewith;

a spring connected between said housing and said lever arm for normally urging said damper towards said open position;

a motor mounted on said housing and actuable to overcome the force of said spring to move said damper to said closed position; and a force translation arrangement disposed between said motor and said lever arm for translating the driving force of said motor when said motor is energized to move said damper to said closed position and for gradually braking said motor due to the motor's internal friction when said motor is de-energized and said spring returns said damper to said open position, wherein said force translation arrangement comprises:

a spool rotatably mounted on said housing and drivingly connected with said motor; and a band connected between said lever arm and said spool, said band being selectively windable upon and unwindable from said spool.

2. The device of claim 1, wherein said housing includes a pair of stops, each being engageable with said lever arm to define the limits of travel of said damper corresponding to said open position and said closed position.

3. The device of claim 2, wherein at least one of said stops is adjustable.

4. The device of claim 1, wherein said spring is a torsion spring surrounding said shaft.

5. The device of claim 1, wherein said motor is a synchronous hysteresis electric motor.

6. The device of claim 1, wherein said housing includes a sidewall upon which said shaft, said lever arm and said spring are mounted, and a motor plate having said motor secured to said sidewall.

7. The device of claim 6, wherein said sidewall includes a bearing retainer having a first raised rim and a second raised rim.

8. The device of claim 1, wherein said spring has a first end engageable with said housing and a second end engageable with said lever arm.

9. The device of claim 6, wherein the lever arm is formed with a spherical protrusion engageable against said motor plate.

10. In a drive system for a damper rotatably mounted on a shaft in a housing between an open position and a closed position, said housing including a rotatable element joined to said shaft for rotation therewith, a biasing element for urging said damper to said open position and a motor actuable to overcome the force of said biasing element to move said damper to said closed position, the improvement residing in:

a wind-up spool mounted on said housing in driving engagement with said motor; and a flexible band extending between said spool and said rotatable element, said band being windable upon said spool when said motor is selectively actuated to move said damper to said closed position, and unwindable from said spool when said motor is deactivated allowing said biasing element to rotate said shaft, said damper, said rotatable element, said motor and said spool such that said damper returns to said open position, said spool and said band defining an over-travel mechanism for preventing damage to said motor as said damper assumes said open position.

11. The improvement of claim 10, wherein said biasing element is a torsion spring.

12. The improvement of claim 10, wherein said band is wrappable about a peripheral portion of said rotatable element.

13. The improvement of claim 10, wherein said rotatable element has a hub surrounding said shaft.

14. The improvement of claim 13, wherein said torsion spring is nested beneath and within said hub.

15. The improvement of claim 10, wherein said flexible band has a first end with a first lug and a second end with a second lug.

16. The improvement of claim 15, wherein said first lug is snap fitted in a retention slot formed in said rotatable element.

17. The improvement of claim 15, wherein said second lug is selectively engageable with a slot formed in said spool.

18. A mechanism for driving at least one damper supported in a housing for motion between an open position and a closed position, said mechanism comprising:

at least one rotatable shaft secured to said at least one damper for pivoting said at least one damper between said open position and said closed position;

a lever arm mounted on said at least one shaft for rotation therewith, said lever arm having a pair of stop surfaces;

a pair of stops secured to said housing, each of said stops being engageable with one of said stop surfaces so as to define limits of travel of at least one said damper corresponding to said open position and said closed position;

a biasing device connected between said housing and said lever arm for normally urging said at least one damper towards said open position;

a spool rotatably mounted on said housing;

a flexible band extending between said spool and said lever arm, said band being windable upon said spool; and a motor and gear train drivingly connected to said spool, wherein selective actuation of said motor and gear train enables said band to be wound upon said spool so as to overcome the force of said biasing device and rotate said at least one shaft, at least one said damper and said lever arm towards said closed position at which one of said stop surfaces engages one of said stops, and selective deactivation of said motor and gear train enables said biasing device to rotate said at least one shaft, said at least one damper, said lever arm, said motor, said gear train and said spool until said open position is reached at which the other of said stop surfaces engages the other of said stops and rotation of said at least one shaft, said at least one damper and said lever arm is terminated, said motor, said gear train and said spool continuing to rotate by their own inertia causing said band to unwind from said spool and enable a gradual slowdown of said motor and said gear train to prevent damage thereto.

19. The mechanism of claim 18, including:

a second damper mounted in said housing;

a second rotatable shaft spaced from said at least one rotatable shaft and secured to said second damper for pivoting said second damper between said open position and said closed position; and a second lever arm mounted on said second shaft for rotation therewith.

20. The mechanism of claim 19, including a movable tension member having one end connected to said lever arm and another end secured to said second lever arm rotatably mounted on said second rotatable shaft.

21. The mechanism of claim 20, wherein the tension member is a substantially rigid link.

22. The mechanism of claim 20, wherein the tension member is a substantially flexible belt.

23. The mechanism of claim 19, wherein said lever arm and said second lever arm are provided with trigger springs for preventing wobble of said first damper and said second damper.

24. The mechanism of claim 21, wherein said link is snap fitted to said lever arm and said second lever arm.

25. The mechanism of claim 21, wherein said lever arm and said second lever arm are each formed with a single retention slot.

26. The mechanism of claim 21, wherein said lever arm is formed with first and second retention slots, and said second lever arm is formed with third and fourth retention slots.

27. The mechanism of claim 21, wherein said first and third retention slots are located in offset planes relative to said second and fourth retention slots.

28. The mechanism of claim 22, wherein said flexible band extends between said spool and said second retention slot, and said flexible belt extends between said first retention slot and said fourth retention slot.

* * * * *